US009848279B2

(12) United States Patent
Cui et al.

(10) Patent No.: US 9,848,279 B2
(45) Date of Patent: Dec. 19, 2017

(54) USER EQUIPMENT CATEGORIES FOR MACHINE-TO-MACHINE DEVICES OPERATING IN AN INTERNET OF THINGS NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Weihua Ye, Bartlett, IL (US); Yung Shirley Choi-Grogan, Issaquah, WA (US)

(73) Assignees: AT&T Intellectual Property I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 30 days.

(21) Appl. No.: 14/851,596

(22) Filed: Sep. 11, 2015

(65) Prior Publication Data
US 2017/0078826 A1 Mar. 16, 2017

(51) Int. Cl.
| H04W 72/00 | (2009.01) |
| H04W 4/00 | (2009.01) |
| H04L 29/08 | (2006.01) |
| H04W 8/24 | (2009.01) |

(52) U.S. Cl.
CPC ............. *H04W 4/005* (2013.01); *H04L 67/12* (2013.01); *H04W 8/24* (2013.01)

(58) Field of Classification Search
CPC . H04W 4/005; H04W 28/0215; H04W 4/003; H04W 28/08; H04W 28/18

USPC ......................................... 455/453, 450, 512
See application file for complete search history.

(56) References Cited

U.S. PATENT DOCUMENTS

| 8,639,259 B2 | 1/2014 | Ishii et al. |
| 8,855,624 B2 | 10/2014 | Gerstenberger et al. |
| 8,908,511 B2 | 12/2014 | Andreozzi et al. |
| 9,042,938 B2 | 5/2015 | Nimbalker et al. |
| 2011/0238844 A1* | 9/2011 | Lu ........................ H04W 76/021 709/227 |
| 2012/0207130 A1 | 8/2012 | Jang et al. |
| 2012/0307648 A1 | 12/2012 | Okubo et al. |
| 2013/0165183 A1 | 6/2013 | Gerstenberger et al. |
| 2013/0308572 A1 | 11/2013 | Sayana et al. |
| 2014/0094139 A1 | 4/2014 | Xu et al. |
| 2014/0133325 A1 | 5/2014 | Prasad et al. |
| 2015/0043479 A1 | 2/2015 | Kitazoe et al. |
| 2015/0092590 A1* | 4/2015 | Zhu ........................ H04W 4/005 370/253 |
| 2015/0146522 A1* | 5/2015 | Lau ........................ H04W 76/027 370/230 |
| 2015/0223232 A1 | 8/2015 | Eriksson et al. |

* cited by examiner

*Primary Examiner* — Tu X Nguyen
(74) *Attorney, Agent, or Firm* — Hartman & Citrin LLC

(57) ABSTRACT

Concepts and technologies disclosed herein are directed to user equipment ("UE") categories for machine-to-machine ("M2M") devices operating in an Internet of things ("IoT") network and future emerging devices. According to one aspect, a network node can receive, from an M2M device, an M2M device category for the M2M device. The network node can determine an action to perform based upon the M2M device category. The network node can cause the action to be performed.

14 Claims, 9 Drawing Sheets

USER EQUIPMENT CATEGORIES FOR MACHINE-TO-MACHINE DEVICES OPERATING IN AN INTERNET OF THINGS NETWORK

BACKGROUND

Wireless network service providers, also known as mobile network operators, have been enjoying extensive growth in network user population and subscriptions. The majority of user equipment ("UE") operating on mobile networks are mobile devices such as basic phones, smartphones, tablets, and the like. Mobile network operators utilize UE category information to allow radio access components, such as eNodeBs ("eNBs") to communicate effectively with all UEs connected thereto. Currently, the UE categories defined in Third Generation Partnership Project ("3GPP") Release 12 Technical Specification 36.606 are based upon a combined uplink and downlink capability.

New, non-traditional device types are now emerging, particularly with the growing interest in machine-to-machine ("M2M") devices and the Internet of Things ("IoT"). It is becoming increasingly challenging for mobile network operators to service effectively the variety of device types and sheer number of devices that, within the next few years, likely will increase to several billion devices worldwide. Moreover, non-traditional device types will likely have distinctly divergent characteristics, including, for example, mobility characteristics (e.g., low, medium, or high mobility), bit rate characteristics (e.g., low, medium, or high bit rate), transmission frequency (e.g., hourly, daily, monthly, or upon request), transceiver characteristics, antenna characteristics, and the like. Non-traditional device types also will likely have distinctly divergent requirements, including bandwidth requirements, delay requirements, jitter requirements, battery life requirements, and the like. These divergent characteristics and divergent requirements will require different treatment by mobile network operators. The traditional ways of identifying UE categories—that is, dependent upon a combined uplink and downlink capability of a UE—will no longer be flexible nor scalable enough to meet the influx of these new, non-traditional device types all vying for service.

SUMMARY

Concepts and technologies described herein relate to UE categories for M2M devices operating in an M2M network. The concepts and technologies described herein define UE categories for devices in a flexible, programmable, and scalable manner. In particular, the concepts and technologies disclosed herein utilize match-action rules to allow mobile network operators to define the UE categories by matching operator-specified rules, attributes, and/or requirements of devices; and further to specify desired actions and network treatment to each match of category, such that these devices can be treated differently from the traffic management trigger point of view, and possibly treated with different quality of service ("QoS"). This approach enables adaptive, flexible and scalable UE categories to adapt to any future devices, including devices with divergent characteristics and divergent requirements.

According to one aspect, a network node can receive, from an M2M device, an M2M device category for the M2M device. The network node can determine an action to perform based upon the M2M device category. The network node can cause the action to be performed. In some embodiments, the network node includes an eNodeB or a software-defined networking ("SDN") radio access network ("RAN") controller. In some embodiments, an M2M device includes an automotive device, an energy device, a healthcare device, an industrial device, a retail device, or a smart home device.

In some embodiments, the network node can receive, from a mobility management entity ("MME"), a M2M UE category definition that defines the M2M device category for the M2M device. The network node also can update a set of UE categories to include the M2M device category. In some embodiments, the M2M device category utilizes a match-action rule that includes an attribute associated with the M2M device and the action. The attributes can include a mobility state, a transmit schedule, a latency, an uplink bandwidth, a downlink bandwidth, a transceiver and antenna configuration, or some combination thereof. The action can include a handover management action, a load balancing action, a scheduled transmit action, a class of service action, or some combination thereof.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
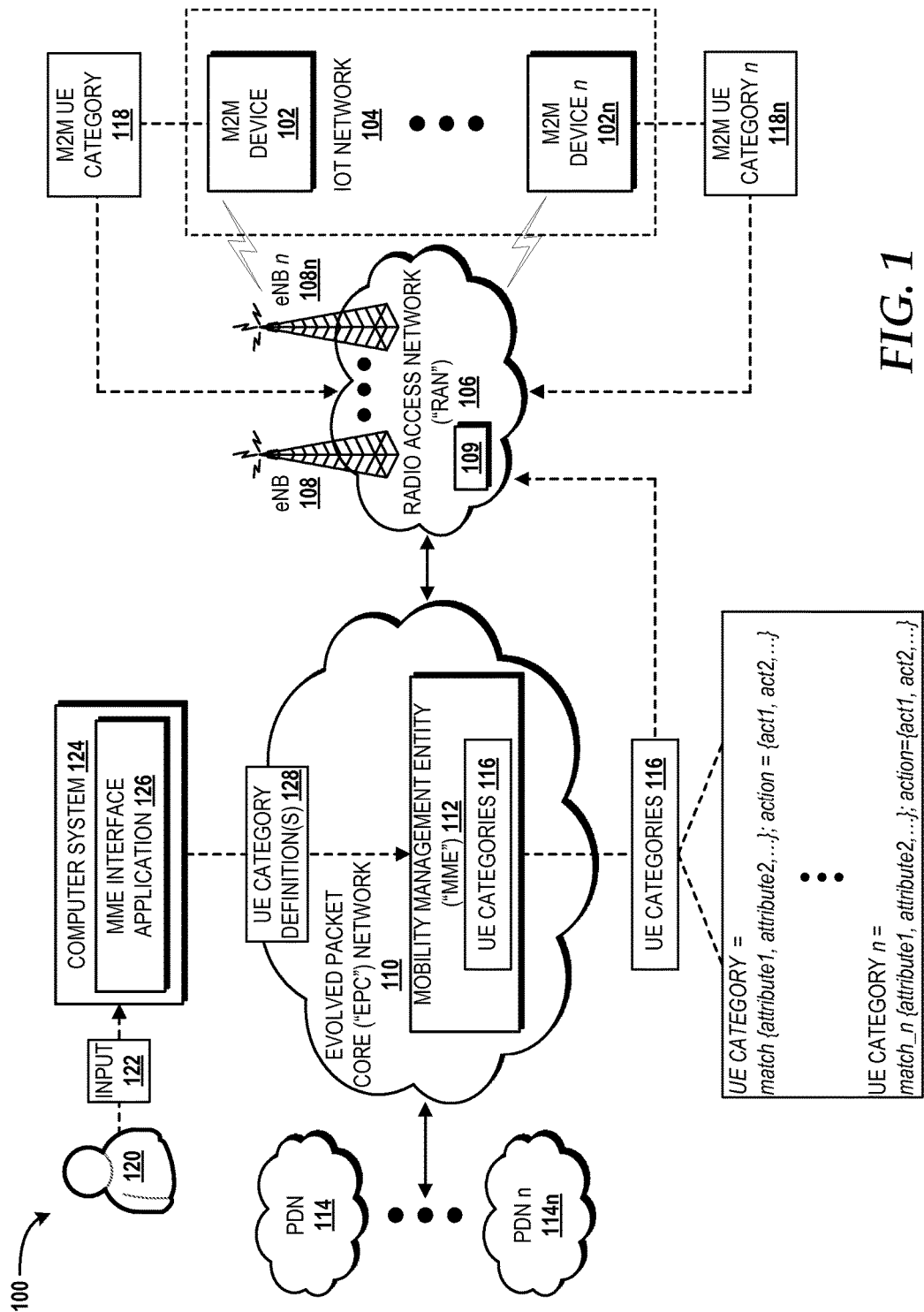
FIG. 1 is a block diagram illustrating aspects of an illustrative operating environment for various concepts disclosed herein.

Concepts and technologies described herein relate to UE categories for M2M devices operating in an M2M network. The concepts and technologies described herein define UE categories for devices in a flexible, programmable, and scalable manner. In particular, the concepts and technologies disclosed herein utilize match-action rules to allow mobile network operators to define the UE categories by matching operator-specified rules, attributes, and/or requirements of devices; and further to specify desired actions and network treatment to each match of category, such that these devices can be treated differently from the traffic management trigger point of view, and possibly treated with different quality of service ("QoS"). This approach enables adaptive, flexible and scalable UE categories to adapt to any future devices, including devices with divergent characteristics and divergent requirements.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, M2M devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of UE categories for M2M devices operating in an M2M network will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes M2M devices 102-102*n* that form, at least in part, an Internet of Things ("IoT") network 104. The IoT is a concept of making physical objects, collectively "things," also referred to herein as M2M devices, network addressable to facilitate interconnectivity for the exchange of data. The illustrated IoT network 104 can include any number of "things," including the M2M devices 102-102*n*, for example. The M2M devices 102-102*n* are each operating on and in communication with a radio access network ("RAN") 106. The M2M devices 102-102*n* can be or can include any "thing" that can collect data and that is configured to be network addressable so as to connect to and communicate with one or more networks, such as the RAN 106, over which to communicate the data to other connected devices, including, for example, computers, smartphones, tablets, vehicles, other M2M devices, combinations thereof, and the like. The M2M devices 102-102*n* can be deployed for consumer use, business use, and can find application in many industry-specific use cases. For example, the M2M devices 102-102*n* may find at least partial application in the following industries: automotive, energy, healthcare, industrial, retail, and smart buildings/homes. Those skilled in the art will appreciate the applicability of M2M-solutions in other industries as well as consumer and business use cases. For this reason, the applications of the M2M devices 102-102*n* described herein are used merely to illustrate some examples and therefore should not be construed as being limiting in any way. Although in the illustrated example the M2M devices 102-102*n* are shown as being in communication with one RAN (i.e., the RAN 106), the M2M devices 102-102*n* may be in communication with any number of access networks, including networks that incorporate collocated WWAN WI-FI and cellular technologies, and as such, one or more of the M2M devices 102-102*n* can be dual-mode devices.

The RAN 106, can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 106 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNode-B), pico cell-type, and micro cell-type, in general contrast to a macro cell-type, which offers a larger coverage area. Other cell-types, including proprietary cell-types and temporary cell-types are also contemplated.

As used herein, a "base station" refers to a radio receiver and/or transmitter (collectively, transceiver) that is/are configured to provide a radio/air interface over which one or more M2M devices, such as the M2M devices 102-102*n*, can connect to a network. Accordingly, a base station is intended to encompass one or more base transceiver stations ("BTSs"), one or more NodeBs, one or more eNodeBs ("eNBs"), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the M2M devices 102-102*n*.

The RAN 106 might operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like. The RAN 106 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the M2M devices 102-102n. Data communications can be provided in part by the RAN 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like.

In the illustrated embodiment, the RAN 106 includes a plurality of eNBs 108-108n and a software-defined networking ("SDN") RAN controller 109. The plurality of eNBs 108-108n are each capable of communicating with one or more of the M2M devices 102-102n. The SDN RAN controller 109 can, on-demand, allocate wireless spectrum resources to the plurality of eNBs 108-108n operating within the RAN 106. The illustrated embodiment is illustrative and should not be construed as being limiting in any way.

The RAN 106 is shown as being in communication with an evolved packet core ("EPC") network 110. The illustrated EPC network 110 includes a mobility management entity ("MME") 112. The EPC network 110 can additionally include other EPC components such as, but not limited to, one or more serving gateways ("SGWs"), one or more packet data networks ("PDN") gateways ("PGWs"), and one or more home subscriber servers ("HSSs"). The SGW(s) provides a point of interconnect between the radio-side (e.g., the RAN 106) and the EPC network 110. An SGW serves the M2M devices 102-102n (and other UEs not shown) by routing incoming and outgoing IP packets. A PGW interconnects the EPC network 110 and one or more external IP networks, shown in the illustrated embodiment as packet data networks ("PDNs") 114-114n. A PGW routes IP packets to and from the PDNs 114-114n. A PGW also performs operations such as IP address/IP prefix allocation, policy control, and charging. In some implementations, a PGW and an SGW are combined. An HSS is a database that contains user/subscriber information. An HSS also performs operations to support mobility management, call and session setup, user authentication, and access authorization.

The MME 112 controls signaling related to mobility and security for E-UTRAN access, such as via the RAN 106, by the M2M devices 102-102n. The illustrated MME 112 includes a set of UE categories 116 ("UE categories 116"). The UE categories 116 are utilized to ensure the eNBs 108-108n can communicate correctly with the M2M devices 102-102n as well as other UEs, such as mobile phones, tablets, and the like (not shown). In accordance with the concepts and technologies disclosed herein, the UE categories 116 includes one or more categories specific to the divergent characteristics and divergent requirements of the M2M devices 102-102n. In addition, the UE categories 116 can include UE categories defined in 3GPP Release 12 Technical Specification 36.606—specifically, in tables 4.1-1 and 4.1-2—for traditional UEs such as mobile devices.

The UE categories 116 are utilized by the eNBs 108-108n and/or the SDN RAN controller 109 to ensure that the eNBs 108-108n can communicate correctly with the M2M devices 102-102n. Each of the UE categories 116 can define the overall performance and the capabilities for a type of M2M device. Each of the M2M devices 102-102n is associated with a particular one of the UE categories 116—shown as M2M UE categories 118-118n corresponding to the M2M devices 102-102n, respectively. Each of the M2M devices 102-102n can send its associated M2M UE category 118-118n to one or more of the eNBs 108-108n. As the UE categories 116 define the overall performance and the capabilities of the M2M devices 102-102n, it is possible for the eNBs 108-108n to communicate using capabilities that the eNBs 108-108n know the M2M devices 102-102n possess. Accordingly, the eNB 108-108n will not communicate with the M2M devices 102-102n beyond the capabilities of the M2M devices 102-102n as defined in the M2M UE categories 118-118n.

The UE categories 116 can be defined, at least in part, by a user 120, such as an engineer or other personnel, who provides input 122 to a computer system 124 executing an MME interface application 126. According to various embodiments, the functionality of the computer system 124 may be provided by one or more server computers, desktop computers, tablet computers, laptop computers, other computing systems, and the like. It should be understood that the functionality of the computer system 124 can be provided by a single device, by two similar devices, and/or by two or more dissimilar devices. For purposes of describing the concepts and technologies disclosed herein, the computer system 124 is described herein as a personal computer. It should be understood that this embodiment is illustrative, and should not be construed as being limiting in any way.

The computer system 124 can execute one or more operating systems (best shown in FIG. 7) and one or more application programs such as the MME interface application 126. The operating system is a computer program for controlling the operation of the computer system 124. The MME interface application 126 is an executable program configured to execute on top of the operating system to provide various functions. In particular, the MME interface application 126 can be configured to provide an interface through which the user 120 can provide the input 122 to create one or more UE category definitions 128 and can provide the UE category definitions 128 to the MME 112 for inclusion as part of the UE categories 116.

The input 122 can be or can include one or more mobile network operator specified rules, one or more attributes, one or more requirements, or any combination thereof, and further can specify one or more desired actions and/or network treatment(s) to each match of category, such that the M2M devices 102-102n can be treated differently for traffic management and quality of service ("QoS"). The UE category definition(s) 128 can utilize a match-action format. In particular, a UE category can be set to equal a match of one or more attributes to one or more actions. An attribute can be any attribute, some examples of which include mobility state, transmit schedule, latency, uplink bandwidth, downlink bandwidth, transceiver and antenna configuration, and the like. An action can be any action that a mobile network operator, and more particularly, the user 120, specifies for a given UE category. Some example actions include mobility treatment such as handover management, load balancing participation, scheduled transmit, and the like. As one non-limiting example, a UE category SS-M2M (stationary scheduled M2M device, e.g., a meter reader or like device) and its actions can be defined as: SS-M2M={mobility state=0; transmit schedule=fixed schedule}; Action={no mobility treatment, no load balancing participation; transmit once a month opportunistically}. As another non-limited example, a UE category V2V-M2M (vehicle-to-vehicle M2M device) and its actions can be defined as: V2V-M2M={mobility state=high; Latency=very low}; Action={highest CoS}.

It should be understood that some implementations of the operating environment 100 include multiple RANs 106, multiple SDN RAN controllers 109, multiple EPC networks 110, multiple MMEs 112, multiple users 120, multiple inputs 122, multiple computer systems 124, multiple MME interface applications 126, or some combination thereof. Thus, the illustrated embodiment should be understood as being illustrative, and should not be construed as being limiting in any way.

Figure 2:
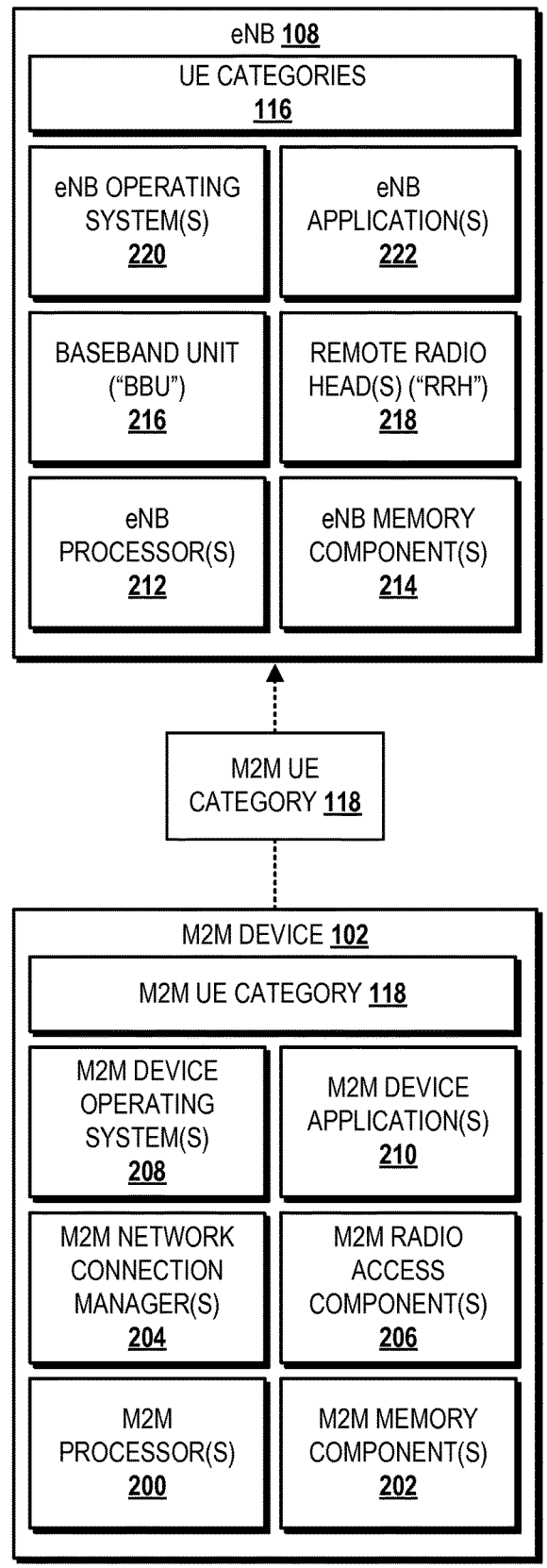
FIG. 2 is a block diagram illustrating aspects of an illustrative M2M device sharing an illustrative M2M UE category with an illustrative eNB, according to an illustrative embodiment of the concepts and technologies disclosed herein.

Turning now to FIG. 2, a block diagram illustrating additional aspects of an illustrative M2M device sharing an illustrative M2M UE category with an illustrative eNB will be described, according to an illustrative embodiment of the concepts and technologies disclosed herein. The illustrated M2M device 102 includes one or more M2M processors 200, one or more M2M memory components 202, one or more M2M network connection managers 204, one or more M2M radio access components 206, one or more M2M device operating systems 208, and one or more M2M device applications 210. The illustrated M2M device 102 also includes the M2M UE category 118. The illustrated eNB 108 includes one or more eNB processors 212, one or more eNB memory components 214, a baseband unit ("BBU") 216, one or more remote radio heads ("RRHs") 218, one or more eNB operating systems 220, and one or more eNB applications 222. The illustrated eNB 108 also includes the UE categories 116. Each of these components will now be described in detail.

The M2M processor 200 can include a central processing unit ("CPU") configured to process data, execute computer-executable instructions of one or more application programs, and communicate with other components of the M2M device 102 in order to perform various functionality described herein. The M2M processor 200 may be utilized to execute aspects of the M2M device operating system 208 and the M2M device application. In some embodiments, the M2M processor 200 is, or is included in, a system-on-chip ("SoC") along with one or more of the other components described herein below. For example, the SoC may include the M2M processor 200, a GPU, and the M2M radio access component(s) 206. In some embodiments, the M2M processor 200 is fabricated, in part, utilizing a package-on-package ("PoP") integrated circuit packaging technique. Moreover, the M2M processor 200 may be a single core or multi-core processor. The M2M processor 200 may be created in accordance with an ARM architecture, available for license from ARM HOLDINGS of Cambridge, United Kingdom. Alternatively, the M2M processor 200 may be created in accordance with an x86 architecture, such as is available from INTEL CORPORATION of Mountain View, Calif. and others. In some embodiments, the M2M processor 200 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The M2M memory components 202 can include a random access memory ("RAM"), a read-only memory ("ROM"), an integrated storage memory ("integrated storage"), and a removable storage memory ("removable storage"), or some combination thereof. In some embodiments, the M2M memory components 202 are included as part of the M2M processor 200. In some embodiments, the M2M memory components 202 store the M2M device operating system(s) 208 or a portion thereof (e.g., operating system kernel or bootloader), the M2M device application(s) 210, and the M2M UE category 118.

The M2M network connection manager 204 can manage all or a portion of the network connections available to the M2M device 102 at a given time. The network connections can include, for example, connections established via the M2M radio access components 206, which may be or may include one or more cellular radios and/or other radios suited for the radio access technologies described herein above. In some embodiments, the M2M network connection manager 204 is included as part of the M2M device operating system 208 and/or the M2M device application(s) 210.

The M2M device operating system 208 is a program for controlling the operation of the M2M device 102. The M2M device operating system 208 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The M2M device application 210 can be any application that performs operations for the M2M device 102. For example, the M2M device application 210 can include applications for use in automotive, energy, healthcare, industrial, retail, and smart buildings/homes use cases for the M2M device 102.

The eNB processor 212 can include one or more processing units configured to process data, execute computer-executable instructions of one or more application programs, and communicate with other components of the eNB 108 in order to perform various functionality described herein. The eNB processor 212 may be utilized to execute aspects of the eNB operating system 220 and the eNB application 222. In some embodiments, the eNB processor 212 is or includes a CPU, a communications processor, or a field-programmable gate array ("FPGA"). In some embodiments, the eNB processor 212 is, or is included in, a SoC along with one or more of the other components described herein below. For example, the SoC may include the eNB processor 212, a GPU, the BBU 216, the RRH 218, or some combination thereof. In some embodiments, the eNB processor 212 is fabricated, in part, utilizing a PoP integrated circuit packaging technique. Moreover, the eNB processor 212 may be a single core or multi-core processor. The eNB processor 212 may be created in accordance with an ARM architecture, available for license from ARM HOLDINGS of Cambridge, United Kingdom. Alternatively, the eNB processor 212 may be created in accordance with an x86 architecture, such as is available from INTEL CORPORATION of Mountain View, Calif. and others. In some embodiments, the eNB processor 212 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an OMAP SoC, available from TEXAS INSTRUMENTS of Dallas, Tex., a customized version of any of the above SoCs, or a proprietary SoC.

The eNB memory components 214 can include a RAM, a ROM, an integrated storage memory, and a removable storage memory, or some combination thereof. In some embodiments, the eNB memory components 214 are included as part of the M2M processor 200. In some embodiments, the eNB memory components 214 store the eNB operating system(s) 220 or a portion thereof (e.g., operating system kernel or bootloader), the eNB application(s) 222, and the UE categories 116.

The BBU 216 is the baseband processing unit of the eNB 108. The BBU 216 can include other components shown, including, for example, the eNB processor(s) 212, the eNB memory component(s) 214, the eNB operating system(s) 220, the eNB application(s) 222, or some combination thereof. The BBU 216 can receive IP packets received from the EPC network 110 and can modulate the IP packets into digital baseband signals. The BBU 216 can send the digital baseband signals to the RRH(s) 218. The digital baseband signals received from the RRH(s) 218 are demodulated and IP packets are transmitted to the EPC network 110. The RRH(s) 218 can transmit and receive wireless signals from the M2M device, including a signal carrying the M2M UE category 118, for example. The RRH(s) 218 also convert the digital baseband signals from the BBU 216 that have been subjected to protocol-specific processing into RF signals and power amplifies the signals for transmission to the M2M device 102. The RF signals received from the M2M device 102 are amplified and converted to digital baseband signals for transmission to the BBU 216.

The eNB operating system 220 is a program for controlling the operation of the eNB 108. The eNB operating system 220 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The eNB application 222 can be any application that performs operations for the eNB 108. For example, the eNB application 222 can be or can include software compliant with 3GPP standards for call control processing, performance management, self-organizing network functions, and the like.

Figure 3:
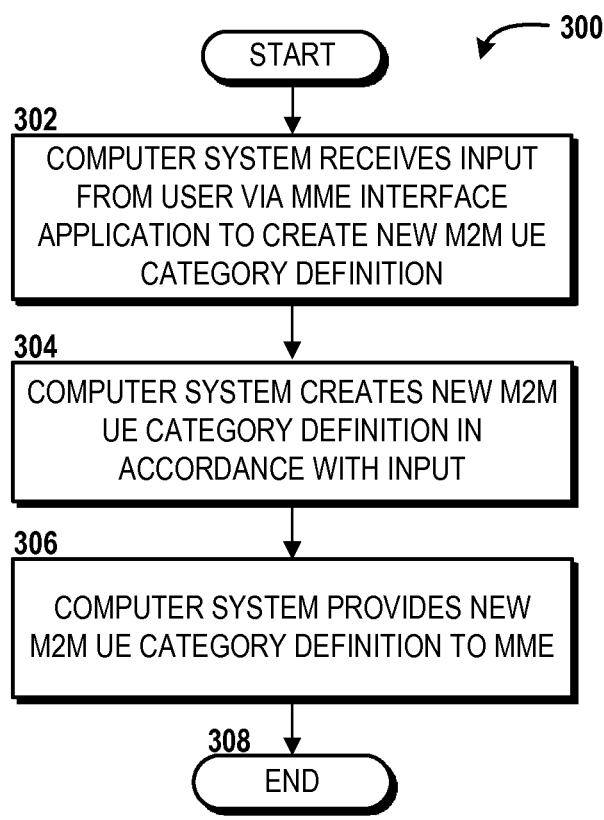
FIG. 3 is a flow diagram illustrating aspects of a method for defining M2M device UE categories, according to an illustrative embodiment of the concepts and technologies disclosed herein.

Turning now to FIG. 3, a flow diagram illustrating aspects of a method 300 for defining M2M UE categories will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the computer system 124, the MME 112, the eNB 108, and/or one or more other computing systems and/or devices disclosed herein to perform operations.

For purposes of illustrating and describing some of the concepts of the present disclosure, the methods disclosed herein are described as being performed, in part, by the computer system 124, the MME 112, and the eNB 108, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302, where the computer system 124 receives the input 122 from the user 120 via the MME interface application 126 to create a new M2M UE category definition, such as one of the UE category definitions 128. In particular, the user 120 can provide, via the input 122, one or more attributes that an M2M device, such as one of the M2M devices 102-102n, should have in order to be associated with the new M2M UE category definition, and one or more actions that the eNBs 108-108n should perform for UEs that exhibit such attribute(s). More particularly, the computer system 124 can receive the input 122 from the user 120 that specifies one or more rules, one or more attributes, one or more requirements, or any combination thereof, and further can specify one or more desired actions and/or network treatment(s) to each match of category, such that the M2M devices 102-102n can be treated differently for traffic management and QoS. The UE category definition(s) 128 can utilize a match-action format. In particular, a UE category can be set to equal a match of one or more attributes to one or more actions. An attribute can be any attribute, some examples of which include mobility state, transmit schedule, latency, uplink bandwidth, downlink bandwidth, transceiver and antenna configuration, and the like. An action can be any action that a mobile network operator, and more particularly, the user 120, specifies for a given UE category. Some example actions include mobility treatment such as handover management, load balancing participation, scheduled transmit, and the like. As one non-limiting example, a UE category SS-M2M (stationary scheduled M2M device, e.g. a meter reader or like device) and its actions can be defined as: SS-M2M={mobility state=0; transmit schedule=fixed schedule}; Action={no mobility treatment, no load balancing participation; transmit once a month opportunistically}. As another non-limited example, a UE category V2V-M2M (vehicle-to-vehicle M2M device) and its actions can be defined as: V2V-M2M={mobility state=high; Latency=very low}; Action={highest CoS}.

From operation 302, the method 300 proceeds to operation 304, where the computer system 124 creates the new M2M UE category definition in accordance with the input 122 received at operation 302. From operation 304, the method 300 proceeds to operation 306, where the computer system 124 provides the new M2M UE category definition to the MME 112. From operation 306, the method 300 proceeds to operation 308, where the method 300 ends.

Figure 4:
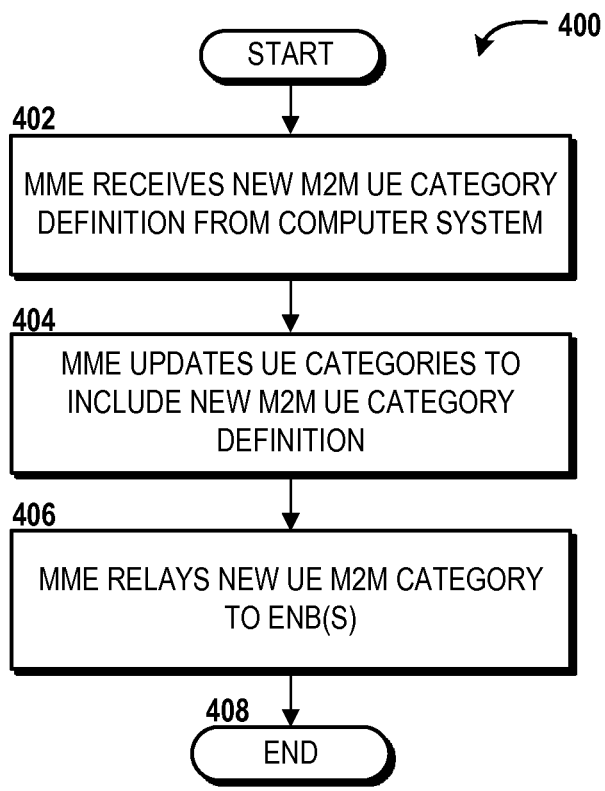
FIG. 4 is a flow diagram illustrating aspects of a method for receiving new UE categories and relaying the new UE categories to one or more eNBs and/or a software-defined networking ("SDN") controller in a radio access network ("RAN"), according to an illustrative embodiment of the concepts and technologies disclosed herein.

Turning now to FIG. 4, a method 400 for receiving new UE categories and relaying the new UE categories to one or more eNBs, such as the eNBs 108, and/or to one or more SDN RAN controllers, such as the SDN RAN controller 109, will be described, according to an illustrative embodiment of the concepts and technologies disclosed herein. The method 400 can be performed after the operations described herein above with reference to FIG. 3. Moreover, the method 400 will be described from the perspective of relaying the new UE categories 116 to one or more of the eNBs 108. The operations described with reference to the method 400 can alternatively or additionally be performed from the perspective of relaying the new UE categories 116 to the SDN RAN controller 109.

The method 400 begins and proceeds to operation 402, where the MME 112 receives the new M2M UE category definition from the computer system 124. From operation 402, the method 400 proceeds to operation 404, where the MME 112 updates the UE categories 116 to include the new M2M UE category definition. From operation 404, the method 400 proceeds to operation 406, where the MME 112 relays the new UE M2M category definition alone or in combination with others in the UE categories 116 to the eNBs 108-108n. From operation 406, the method 400 proceeds to operation 408, where the method 400 ends.

Figure 5:
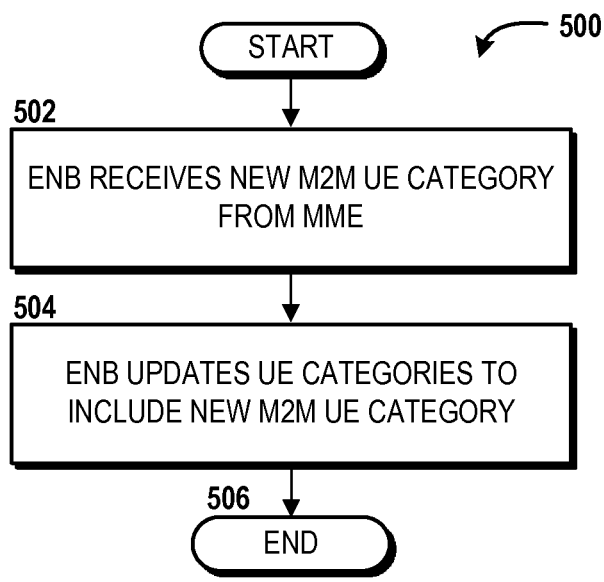
FIG. 5 is a flow diagram illustrating aspects of a method for updating UE categories in response to receiving a new UE category definition from a mobility management entity ("MME"), according to an illustrative embodiment of the concepts and technologies disclosed herein.

Turning now to FIG. 5, a flow diagram illustrating aspects of a method 500 for updating UE categories 116 in response to receiving a new UE category definition 128 from a MME will be described, according to an illustrative embodiment of the concepts and technologies disclosed herein. The method 500 can be performed after the operations described herein above with reference to FIG. 4.

The method 500 begins and proceeds to operation 502, where an eNB, such as one of the eNBs 108-108n, receives the new M2M UE category definition from the MME 112. From operation 502, the method 500 proceeds to operation 504, where the eNB 108 updates the UE categories 116 to include the new M2M UE category definition. From operation 504, the method 500 proceeds to operation 506, where the method 500 ends.

Figure 6:
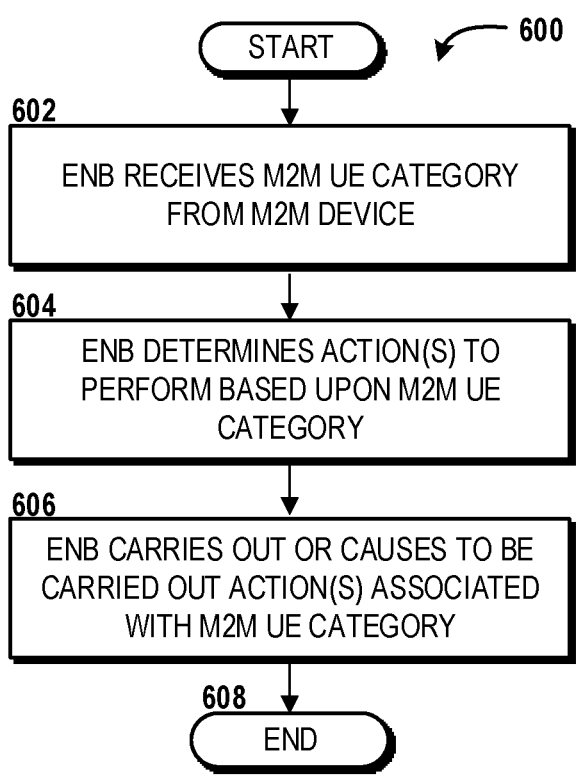
FIG. 6 is a flow diagram illustrating aspects of a method for an eNB to implement one or more actions for an M2M UE category, according to an illustrative embodiment of the concepts and technologies disclosed herein.

Turning now to FIG. 6, a flow diagram illustrating aspects of a method 600 for an eNB to implement one or more actions for an M2M UE category will be described, according to an illustrative embodiment of the concepts and technologies disclosed herein. The method 600 can be performed after the operations described herein above with reference to FIG. 5

The method 600 begins and flow proceeds to operation 602, where the eNB 108 receives the M2M UE category 118 from the M2M device 102. From operation 602, the method 600 proceeds to operation 604, where the eNB 108 determines one or more actions to perform based upon the M2M UE category 118. From operation 604, the method 600 proceeds to operation 606, where the eNB 108 carries out or causes to be carried out one or more actions associated with the M2M UE category 118. Some example actions include mobility treatment such as handover management, load balancing participation, scheduled transmit, and the like. From operation 606, the method 600 proceeds to operation 608, where the method 600 ends.

The concepts and technologies disclosed herein provide a more granular and scalable definition for UE categories and match-action rules for M2M and any future devices. Future devices can include devices that are currently in development or have not yet been developed but have/will have specific requirements that might benefit from more granular definitions. The new definition of UE category (a) for vehicle-to-vehicle and (b) for meter reader allows eNBs, such as the eNBs 108, to provide differential treatments for (a) with guaranteed QoS of low latency in <1 ms round trip delay and potential local ad hoc routing between the vehicle-to-vehicle devices, while for (b) with opportunistic treatment with relaxed delay requirement. Similar granular treatment can apply to core network.

The concepts and technologies disclosed herein also improve eNB/UE performance. For example, if it is desired by an operator that stationary meter readers should not participate in load balancing between eNBs or between cells, when eNB making the load balancing decision, it will not include the meter readers as the load balancing candidates. Therefore, eNB will not ask meter readers to perform measurement for the other eNBs/cells, and the report, etc. This will make eNB load balancing more effective and eNB processing more efficient. This will also save UEs battery power from the extra measurement.

Figure 7:
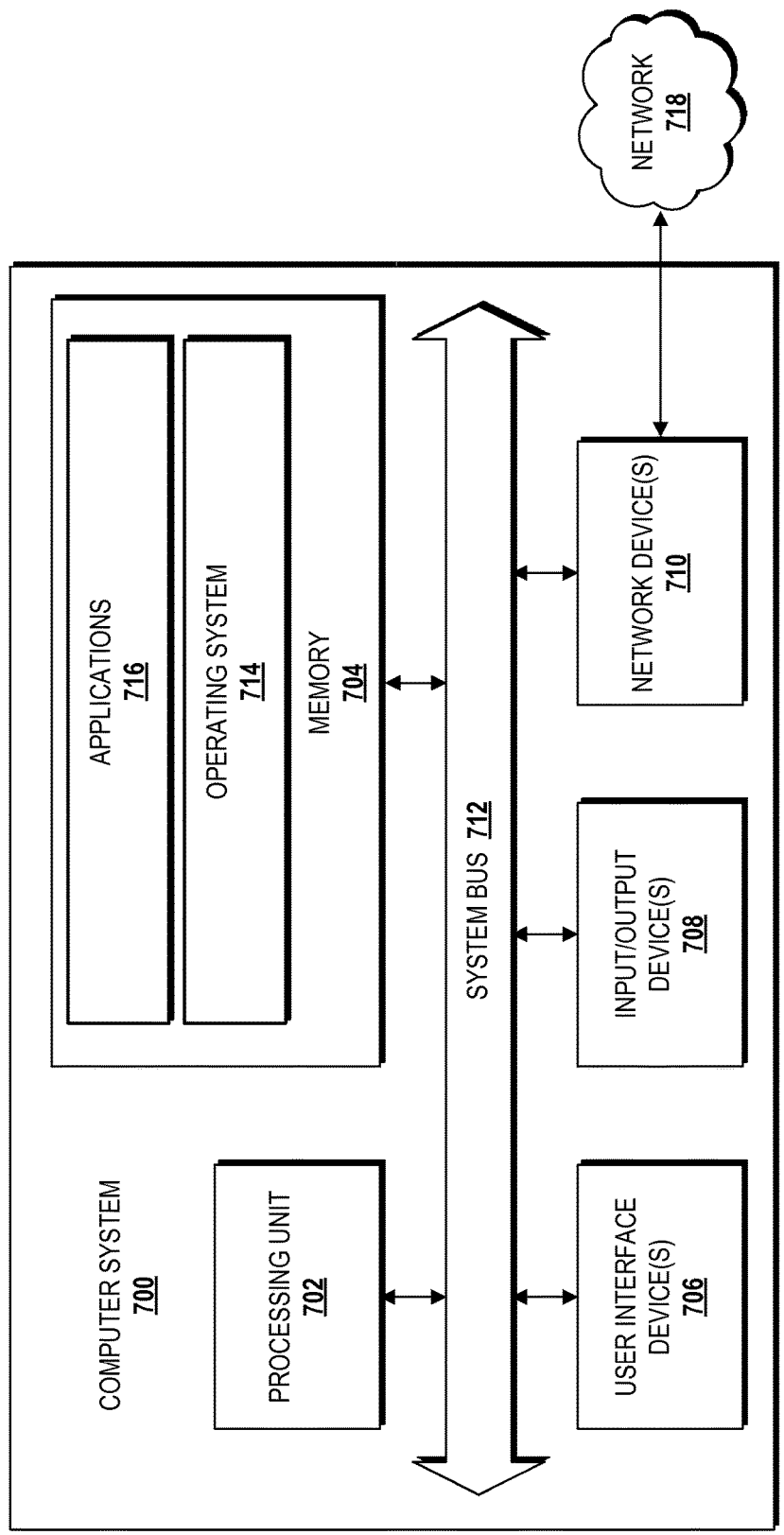
FIG. 7 is a block diagram illustrating an example computer system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the M2M device(s) 102-102n, one or more components of the RAN 106, the eNBs 108-108n, one or more component of the EPC network 110 (e.g., the MME 112), one or more components of the PDN 114-114n, the computer system 124, or some combination thereof is/are configured, at least in part, like the computer system 700. It should be understood, however, that the M2M device(s) 102-102n, one or more components of the RAN 106, the eNBs 108-108n, one or more component of the EPC network 110 (e.g., the MME 112), one or more components of the PDN 114-114n, the computer system 124 may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more applications 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless PAN ("WPAN") such as BLUETOOTH, or a wireless MAN ("WMAN"). Alternatively, the network 718 may be a wired network such as, but not limited to, a WAN such as the Internet, a LAN such as the Ethernet, a wired PAN, or a wired MAN. The network 718 can be or can include the RAN 106.

Figure 8:
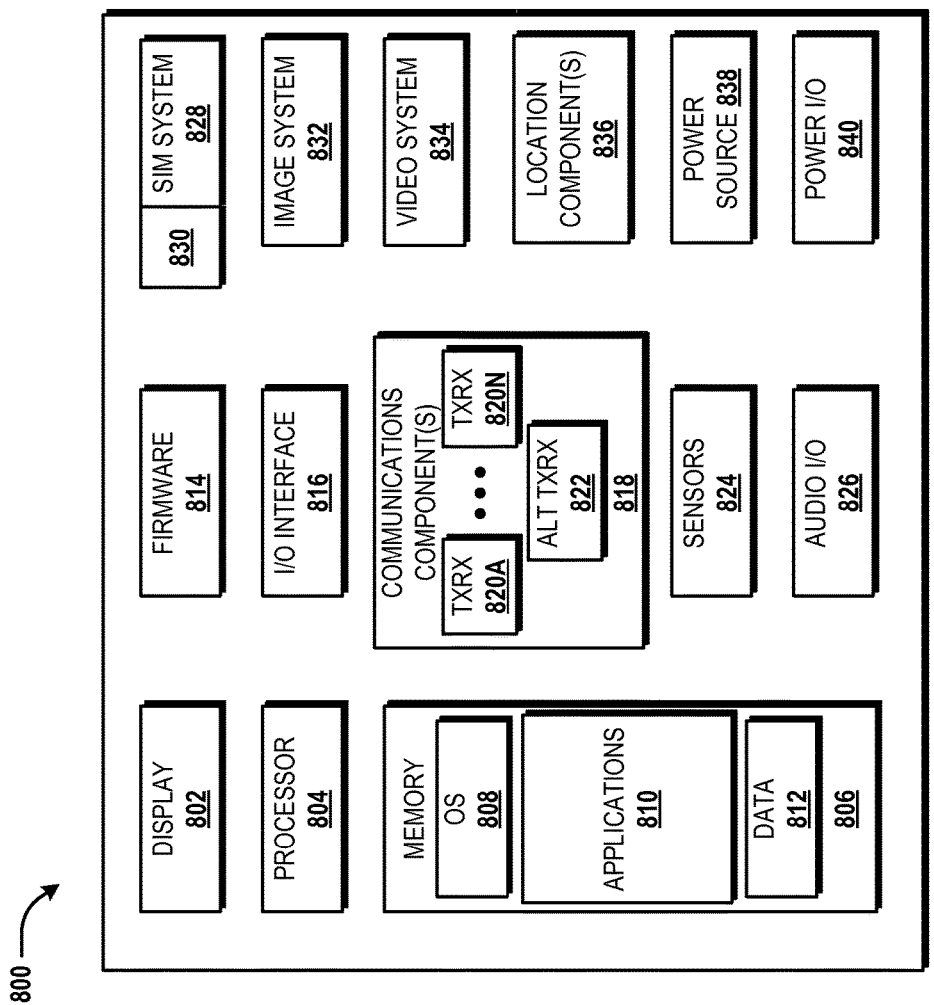
FIG. 8 is a block diagram illustrating an example M2M device capable of implementing aspects of the embodiments disclosed herein.

Turning now to FIG. 8, an illustrative M2M device 800 and components thereof will be described. In some embodiments, the M2M devices 102-102n described above with reference to FIGS. 1 and 2 can be configured as and/or can have an architecture similar or identical to the M2M device 800 described herein in FIG. 8. It should be understood, however, that the M2M devices 102-102n may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the M2M device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The M2M device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, which may include the M2M device applications(s) 210, other computer-executable instructions stored in the memory 806, or the like. In some embodiments, the applications 810 also can include a UI application (not illustrated in FIG. 8).

The UI application can interface with the operating system 808, such as the M2M device operating system 208 shown in FIG. 2, to facilitate user interaction with functionality and/or data stored at the M2M device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in data communications, entering/deleting data, entering and setting user IDs and passwords for device access, configuring settings, manipulating content and/or settings, multimode interaction, interacting with other applications 810, and otherwise facilitating user interaction with the operating system 808, the applications 810, and/or other types or instances of data 812 that can be stored at the M2M device 800. The data 812 can include, for example, the M2M UE category 118, and/or other data.

According to various embodiments, the applications 810 can include, for example, the M2M device applications 210 and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The M2M device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the M2M device 800 can be configured to synchronize with another device to transfer content to and/or from the M2M device 800. In some embodiments, the M2M device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the M2M device 800 and a network device or local device.

The M2M device 800 also can include a communications component 818, such as the M2M radio access component(s) 206. The communications component 818 can be configured to interface with the processor 804 to facilitate wired and/or wireless communications with one or more networks such as the RAN 106 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments, one or more of the transceivers of the communications component 818 may be configured to communicate using GSM, CDMAONE, CDMA2000, LTE, and various other 2G, 2.5G, 3G, 4G, 4.5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The M2M device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like for use in collecting M2M data. Additionally, audio capabilities for the M2M device 800 may be provided by an audio I/O component 826. The audio I/O component 826 of the M2M device 800 can include one or more speakers for the output of audio signals, one or more microphones for the collection and/or input of audio signals, and/or other audio input and/or output devices.

The illustrated M2M device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the M2M device 800 are contemplated, it should be understood that these embodiments are illustrative, and should not be construed as being limiting in any way.

The M2M device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The M2M device 800 may also include a video system 834. The video system 834 can be configured to capture, process, record, modify, and/or store video content. Photos and videos obtained using the image system 832 and the video system 834, respectively, may be added as message content to an MMS message, email message, and sent to another M2M device. The video and/or photo content also can be shared with other devices via various types of data transfers via wired and/or wireless communication devices as described herein.

The M2M device 800 also can include one or more location components 836. The location components 836 can be configured to send and/or receive signals to determine a geographic location of the M2M device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the M2M device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the M2M device 800. Using the location component 836, the M2M device 800 can generate and/or receive data to identify its geographic location, or to transmit data used by other devices to determine the location of the M2M device 800. The location component 836 may include multiple components for determining the location and/or orientation of the M2M device 800.

The illustrated M2M device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the M2M device 800 can include additional and/or alternative components, the above embodiment should be understood as being illustrative of one possible operating environment for various embodiments of the concepts and technologies described herein. The described embodiment of the M2M device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the M2M device 800 or other devices or computers described herein, such as the computer system 800 described above with reference to FIG. 8. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the M2M device 800 in order to store and execute the software components presented herein. It is also contemplated that the M2M device 800 may not include all of the components shown in FIG. 8, may include other components that are not explicitly shown in FIG. 8, or may utilize an architecture completely different than that shown in FIG. 8.

Figure 9:
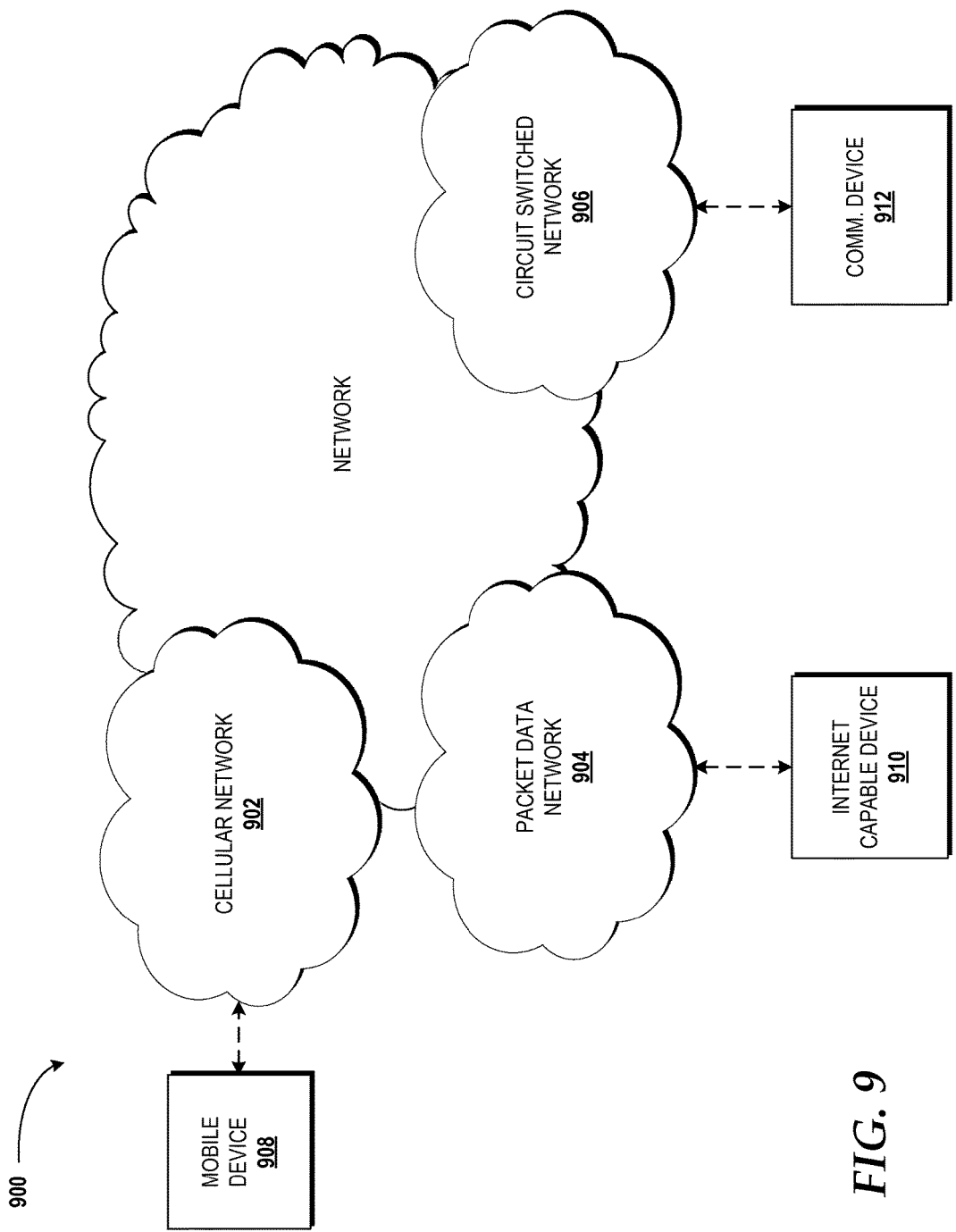
FIG. 9 is a diagram illustrating a network, according to an illustrative embodiment.

Turning now to FIG. 9, details of a network 900 are illustrated, according to an illustrative embodiment. The network 900 includes a cellular network 902 (e.g., the cellular access network 106 and the EPC network 110), a packet data network 904 (e.g., one or more of the PDNs 114-114n), and a circuit switched network 906 (e.g., a public switched telephone network). The network 900 can include the operating environment 100 illustrated and described with reference to FIG. 1.

The cellular network 902 includes various components such as, but not limited to, BTSs, Node-Bs or e-Node-Bs (e.g., the eNBs 108-108n), base station controllers ("BSCs"), radio network controllers ("RNCs"), mobile switching centers ("MSCs"), MMEs (e.g., the MME 112), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 902 also includes radios and nodes for receiving and transmitting voice, data, and combinations thereof to and from radio transceivers, networks, the packet data network 904, and the circuit switched network 906. The cellular network 902 can include the RAN 106.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 can include the PDNs 114-114n. The packet data network 904 includes various devices, for example, servers, computers, databases, and other devices in communication with one another, as is generally known. In some embodiments, the packet data network 904 is or includes one or more WI-FI networks, each of which can include one or more WI-FI access points, routers, switches, and other WI-FI network components. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the M2M device 102, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910.

Based on the foregoing, it should be appreciated that concepts and technologies for UE categories for M2M devices operating in an IoT network have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A network node comprising:
a processor; and
a memory that stores a set of machine-to-machine device categories and instructions that, when executed by the processor, cause the processor to perform operations comprising
receiving, from a mobility management entity, a machine-to-machine device category definition created based on input received by the mobility management entity from a computer system, wherein the input comprises an attribute that machine-to-machine devices should have in order to be associated with the machine-to-machine device category definition and an action that network nodes should perform for machine-to-machine devices that exhibit the attribute, and wherein the machine-to-machine device category definition comprises a machine-to-machine device category associated with the attribute and the action,
updating the set of machine-to-machine device categories to include the machine-to-machine device category definition,
receiving, from a machine-to-machine device, a machine-to-machine device category for the machine-to-machine device,
determining, based at least in part upon the machine-to-machine device category received from the machine-to-machine device and the machine-to-machine device category associated with the attribute and the action from the set of machine-to-machine device categories, that the action associated with the machine-to-machine device category is to be performed for the machine-to-machine device, and causing the action to be performed for the machine-to-machine device.

2. The network node of claim 1, wherein the network node comprises an eNodeB or a software-defined networking radio access network controller.

3. The network node of claim 1, wherein the attribute comprises a mobility state, a transmit schedule, a latency, an uplink bandwidth, a downlink bandwidth, or a transceiver and antenna configuration.

4. The network node of claim 1, wherein the action comprises a handover management action, a load balancing action, a scheduled transmit action, or a class of service action.

5. The network node of claim 1, wherein the machine-to-machine device comprises an automotive device, an energy device, a healthcare device, an industrial device, a retail device, or a smart home device.

6. A method comprising:
receiving, by a network node, from a mobility management entity, a machine-to-machine device category definition created based on input received by the mobility management entity from a computer system, wherein the input comprises an attribute that machine-to-machine devices should have in order to be associated with the machine-to-machine device category definition and an action that network nodes should perform for machine-to-machine devices that exhibit the attribute, and wherein the machine-to-machine device category definition comprises a machine-to-machine device category associated with the attribute and the action;
updating, by the network node, a set of machine-to-machine device categories stored in a memory of the network node to include the machine-to-machine device category definition;
receiving, by the network node, from a machine-to-machine device, a machine-to-machine device category for the machine-to-machine device;
determining, by the network node, based at least in part upon the machine-to-machine device category received from the machine-to-machine device and the machine-to-machine device category associated with the attribute and the action from the set of machine-to-machine device categories, that the action associated with the machine-to-machine device category is to be performed for the machine-to-machine device; and
causing the action to be performed for the machine-to-machine device.

7. The method of claim 6, wherein the attribute comprises a mobility state, a transmit schedule, a latency, an uplink bandwidth, a downlink bandwidth, or a transceiver and antenna configuration.

8. The method of claim 7, wherein the action comprises a handover management action, a load balancing action, a scheduled transmit action, or a class of service action.

9. The method of claim 6, wherein the machine-to-machine device comprises an automotive device, an energy device, a healthcare device, an industrial device, a retail device, or a smart home device.

10. The method of claim 6, wherein the network node comprises an eNodeB or a software defined networking radio access network controller.

11. A computer-readable storage medium having computer-executable instructions stored thereon that, when executed by a processor of a network node, cause the network node to perform operations comprising:
receiving, from a mobility management entity, a machine-to-machine device category definition created based on input received by the mobility management entity from a computer system, wherein the input comprises an attribute that machine-to-machine devices should have in order to be associated with the machine-to-machine device category definition and an action that network nodes should perform for machine-to-machine devices that exhibit the attribute, and wherein the machine-to-machine device category definition comprises a machine-to-machine device category associated with the attribute and the action;
updating a set of machine-to-machine device categories stored in a memory of the network node to include the machine-to-machine device category definition;
receiving, from a machine-to-machine device, a machine-to-machine device category for the machine-to-machine device;
determining, based at least in part upon the machine-to-machine device category received from the machine-to-machine device and the machine-to-machine device category associated with the attribute and the action from the set of machine-to-machine device categories, that the action associated with the machine-to-machine device category is to be performed for the machine-to-machine device; and
causing the action to be performed for the machine-to-machine device.

12. The computer-readable storage medium of claim 11, wherein the network node comprises an eNodeB or a software-defined networking radio access network controller.

13. The computer-readable storage medium of claim 11, wherein the attribute comprises a mobility state, a transmit schedule, a latency, an uplink bandwidth, a downlink bandwidth, or a transceiver and antenna configuration.

14. The computer-readable storage medium of claim 11, wherein the action comprises a handover management action, a load balancing action, a scheduled transmit action, or a class of service action.

* * * * *